United States Patent [19]
Schotz

[11] Patent Number: 4,633,495
[45] Date of Patent: Dec. 30, 1986

[54] TV STEREO ADAPTER
[75] Inventor: Larry Schotz, Cedarburg, Wis.
[73] Assignee: Recoton Corporation, Long Island City, N.Y.
[21] Appl. No.: 758,042
[22] Filed: Jul. 23, 1985
[51] Int. Cl.[4] .............................................. H04H 5/00
[52] U.S. Cl. ...................................... 381/3; 358/144; 358/198; 381/107; 455/41
[58] Field of Search .................... 381/104, 105, 3, 107, 381/109, 110, 122; 455/20, 41; 358/144, 198

[56]  References Cited
U.S. PATENT DOCUMENTS

| | | | |
|---|---|---|---|
| 3,059,189 | 10/1962 | Preisig | 329/135 |
| 3,118,970 | 1/1964 | Silver | 455/20 |
| 3,688,052 | 8/1972 | Self | 179/82 |
| 4,001,709 | 1/1977 | Clinkscales | 330/30 R |
| 4,254,303 | 3/1981 | Takizawa | 455/246 |
| 4,272,788 | 6/1981 | Ogita | 381/3 |
| 4,380,824 | 4/1983 | Inoue | 455/238 |
| 4,389,536 | 6/1983 | Schickedanz | 358/198 |

Primary Examiner—Forester W. Isen
Attorney, Agent, or Firm—Curtis, Morris & Safford

[57] ABSTRACT

A television stereo adapter is provided for use with a television receiver to detect and decode stereophonic audio signals that may be transmitted with the composite television signals. The adapter includes an IF pick-up that is physically separate from the television receiver for picking up spurious IF audio signals that normally are generated by the television receiver. A stereo detector is coupled to the IF pick-up for detecting from the IF audio signals monophonic and stereophonic components that are transmitted with the composite television signals. The detected components are decoded into left-channel and right-channel audio signals; and these left-channel and right-channel signals are adapted to drive sound transducers, such as loudspeakers. Optionally, the left-channel and right-channel audio signals are amplified by gain-controlled amplifiers whose gains are a function of the output sound level of the television receiver.

17 Claims, 6 Drawing Figures

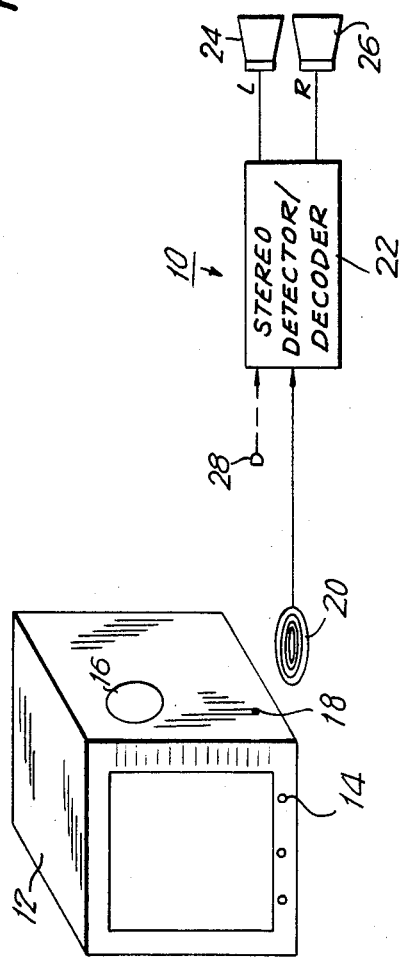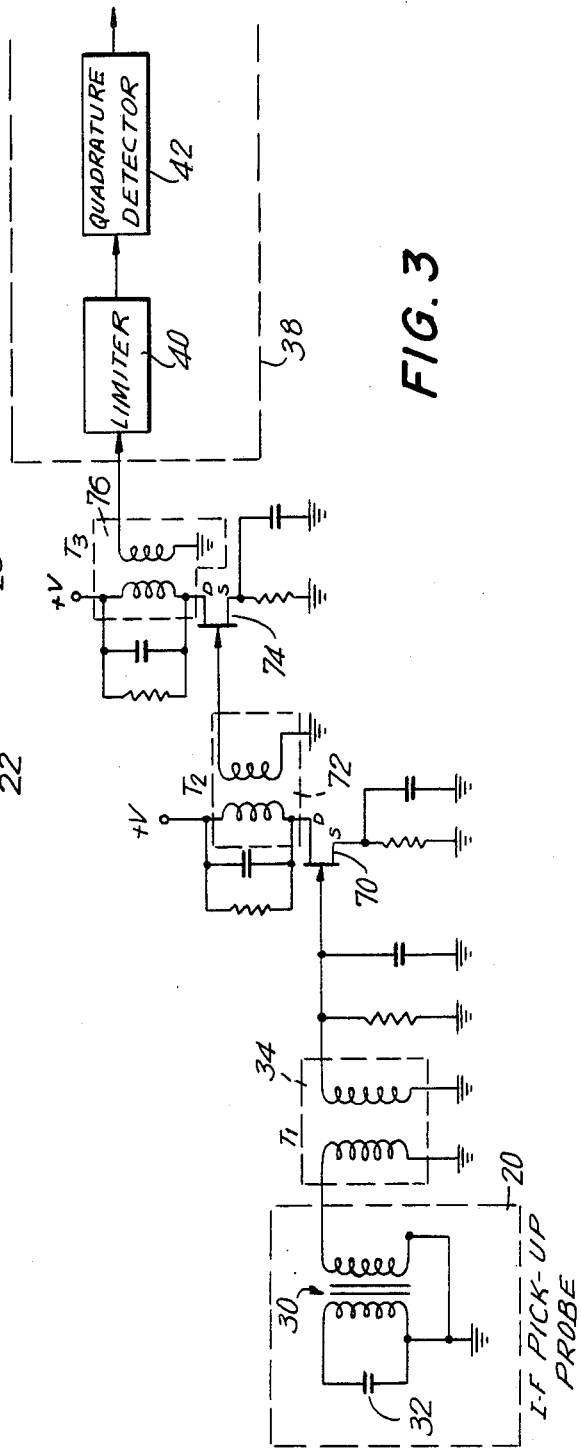

TV STEREO ADAPTER

BACKGROUND OF THE INVENTION

This invention relates to a television stereo adapter and, more particularly, to such an adapter which is physically separate from the conventional television receiver with which it is used to detect and decode stereophonic audio signals that may be transmitted but which are not otherwise detectable by the television receiver. Advantageously, no physical or electrical (i.e. no wired) connections to the television receiver are needed for the successful operation of the stereo adapter. Optionally, however, enhanced results may be attained by connecting the adapter to the usual multiplex output (or MPX) jack of the television receiver.

Recently, the transmission of stereophonic audio signals for television broadcasting has been approved. The format for such stereophonic audio broadcasting is the so-called Zenith system described in, for example, Audio Magazine, June 1984, pages 47-51, and also in Engineering Report GL-84091, National Semiconductor, September 1984, "A Stereo TV Decoder for Zenith System". As described in the aforementioned publications, the Zenith system of stereophonic audio broadcasting includes a monophonic (L+R) component whose base band ranges from 0 to 15 KHz, this monophonic component being frequency modulated onto the usual audio (or sound) frequency carrier $f_S$ that normally accompanies composite television signals, as is conventional, a stereophonic (L−R) component that is amplitude modulated onto a subcarrier of frequency $2f_H$ (wherein $f_H$ is the usual horizontal synchronizing frequency of 15.734 KHz), the amplitude modulated stereo component being of the double sideband suppressed carrier type, a pilot signal of frequency $f_H$, a so-called "second audio program", referred to by those of ordinary skill in the art as SAP, frequency modulated onto a subcarrier whose frequency is $5f_H$, and an auxiliary channel, referred to as a professional channel in which voice or data information may be transmitted, this auxiliary channel being frequency modulated onto a subcarrier of frequency 6.5 $f_H$. The monophonic component, the amplitude modulated double sideband suppressed carrier stereophonic component, the pilot signal, the second audio program and the auxiliary channel all frequency modulate the usual audio carrier $f_S$. Since there is substantially no change in the monophonic (L+R) component, and since this monophonic component serves to frequency modulate the usual audio carrier $f_S$, conventional television receivers that are not equipped to detect or decode the multiplexed stereo signals nevertheless can detect and demodulate the monophonic (L+R) component in the conventional manner. However, those television receivers that are equipped with a stereo detector/decoder compatible with the Zenith system will detect not only the monophonic (L+R) component but also the stereophonic (L−R) component and, by conventional matrix decoding, derive from the monophonic and stereophonic components separate left-channel (L) and right-channel (R) audio signals. Hence, separate left-channel and right-channel loudspeakers may be driven to reproduce stereophonic sounds.

The aforementioned stereo-equipped television receivers also may detect and decode the second audio program which, typically, may provide bi-lingual (or translational) information associated with the broadcasted television program. It also is contemplated that the information transmitted in the auxiliary channel will be detected and utilized either by the television receiver or by other means connected to the television receiver and supplied with the detected information.

To improve and enhance the signal-to-noise ratio of the stereophonic (L−R) component, a noise reduction companding system is used. More particularly, the stereophonic component is subjected to noise reduction compression prior to transmission and to expansion upon reception. The particular noise reduction compression technique that has been adopted for use with the Zenith system is the so-called dbx companding system which has been developed by DBX Inc. of Waltham, Mass. It is, of course, expected that the stereo detector/decoder included in stereo-compatible television receivers will be provided with a noise reduction expansion circuit that is compatible with the dbx compression circuit.

Although the monophonic (L+R) component of the transmitted stereo audio signals still will be detected by conventional television receivers that are not equipped with stereo detectors/decoders, stereophonic sound reproduction, or the sensation (or simulation) of stereophonic sound will not be reproduced. It has been proposed, heretofore, that such conventional television receivers be modified (or retrofitted) in order to detect and reproduce stereophonic sound from TV stereo transmissions. Alternatively, separate receivers capable of receiving the audio portion of television transmissions, that is, the audio carrier $f_S$, and detecting and decoding the stereo signals therefrom, would have to be purchased.

The aforementioned proposals of retrofitting conventional television receivers to include a stereo detector/decoder or purchasing special TV stereo sound receivers not only are expensive but, in many instances, will not be preferred by the several million consumers who now own conventional television receivers that are not compatible with stereo TV transmissions. Consequently, it is believed that, once stereo TV transmissions become more prevalent, there will be a need for a relatively simple adapter that can be used without significant modifications to conventional television receivers. Advantageously, such a stereo TV adapter should be physically and electrically independent of the television receiver, thus requiring no internal wiring or soldering which otherwise would be necessary for the adapter to be compatible and usable with the television receiver. In particular, it is desirable to permit the adapter to pick up the received audio portion of the television program without providing a wired circuit connection between the adapter and the conventional components of the television receiver.

OBJECTS OF THE INVENTION

Therefore, it is an object of the present invention to provide a TV stereo adapter for use with a television receiver for the purpose of detecting and decoding stereophonic audio signals that are transmitted with composite television signals without requiring hard-wired interconnections between the adapter and the television receiver.

Another object of this invention is to provide a TV stereo adapter of the aforementioned type having a pick-up for picking up the audio portion of a received television program, the pick-up being physically independent of the television receiver.

A further object of the invention is to provide a TV stereo adapter of the aforementioned type which need not be re-tuned or re-adjusted as the television receiver is tuned from one broadcast channel to another.

Another object of this invention is to provide a TV stereo adapter of the aforementioned type in which the pick-up is an IF pick-up which senses spurious IF audio signals that normally leak from the IF section of conventional television receivers.

A still further object of this invention is to provide a TV stereo adapter of the aforementioned type in which the spurious IF audio signals are picked up and, if a stereophonic component is present, left-channel and right-channel audio signals are decoded from the picked up IF audio signals.

Yet another object of this invention is to provide a TV stereo adapter of the aforementioned type in which the decoded left-channel and right-channel audio signals are subjected to automatic gain control such that the level of these signals is adjusted as a function of the sound volume adjustment control (e.g. the remote sound level control) normally provided with a conventional television receiver.

A still further object of this invention is to provide a TV stereo adapter of the aforementioned type in which the sound level of the decoded left-channel and right-channel audio signals is controlled as a function of the output sound level of the television receiver.

Various other objects, advantages and features of the present invention will become readily apparent from the ensuing detailed description, and the novel features will be particularly pointed out in the appended claims.

SUMMARY OF THE INVENTION

In accordance with this invention, a TV stereo adapter is provided for use with a television receiver to detect and decode stereophonic audio signals that are transmitted with the composite television signals of a stereo television program. The adapter includes an IF pick-up that is physically separate from the television receiver for picking up spurious IF audio signals that normally are generated, or leaked, by the television receiver. A stereo detector detects monophonic and stereophonic components from the picked up IF signals, and left-channel and right-channel audio signals are decoded from the detected components. The decoded left-channel and right-channel signals are utilized to drive loudspeakers, headphones, or the like.

In accordance with one aspect of this invention, the IF pick-up comprises a pick-up probe that is positionable proximate the IF section normally provided in the television receiver. Preferably, this pick-up probe is an inductive probe tuned to the audio IF subcarrier frequency for inducing the flow therein of IF audio signals.

In accordance with another aspect of this invention, the decoded left-channel and right-channel signals are subjected to automatic gain control in response, at least in part, to the output sound level of the television receiver. As one feature, the output sound level of the television receiver is derived from a microphone which picks up the sounds produced by the loudspeaker normally provided in or with the television receiver. Alternatively, the output sound level of the television receiver may be detected by connecting a plug to the usual headphone jack provided with most television receivers. In either embodiment, the signal representing the output sound level of the television receiver is compared to a decoded signal, and the difference between the compared signals is utilized to adjust the gain of the left-channel and right-channel signals. As another feature, the decoded signal to which the sound-representing signal is compared is selectively supplied to the comparator by a switch that is closed when the detected monophonic (L+R) component exceeds a predetermined threshold level and is opened when the monophonic component is less than that threshold level.

In accordance with yet another aspect of this invention, the adapter is provided with a spatial/stereo/pseudo-stereo change-over circuit that is coupled to the stereo decoder and is responsive to the detection of the stereophonic (L−R) component. If this stereophonic component is present, the decoded left-channel and right-channel signals simply are amplified. If the stereophonic component is not present, resulting in substantially identical output signals produced by the decoder, one of those output signals is filtered and used to simulate the other channel, thus resulting in pseudo left-channel and right-channel signals.

As yet another aspect of the adapter, the detected stereophonic (L−R) component is subjected to noise reduction expansion compatible with the noise reduction compression applied to the stereophonic component prior to its transmission. The adapter thus is compatible with the noise reduction technique utilized by the broadcaster of the composite television signal.

BRIEF DESCRIPTION OF THE DRAWINGS

The following detailed description, given by way of example, and not intended to limit the present invention solely to the embodiments shown and described herein, will best be understood in conjunction with the accompanying drawings in which:

FIG. 1 is a schematic/block representation of the manner in which the present invention is used;

FIG. 3 is a schematic diagram of one embodiment of the pick-up probe that may be used with this invention;

DETAILED DESCRIPTION OF A CERTAIN PREFERRED EMBODIMENT

Figure 2:
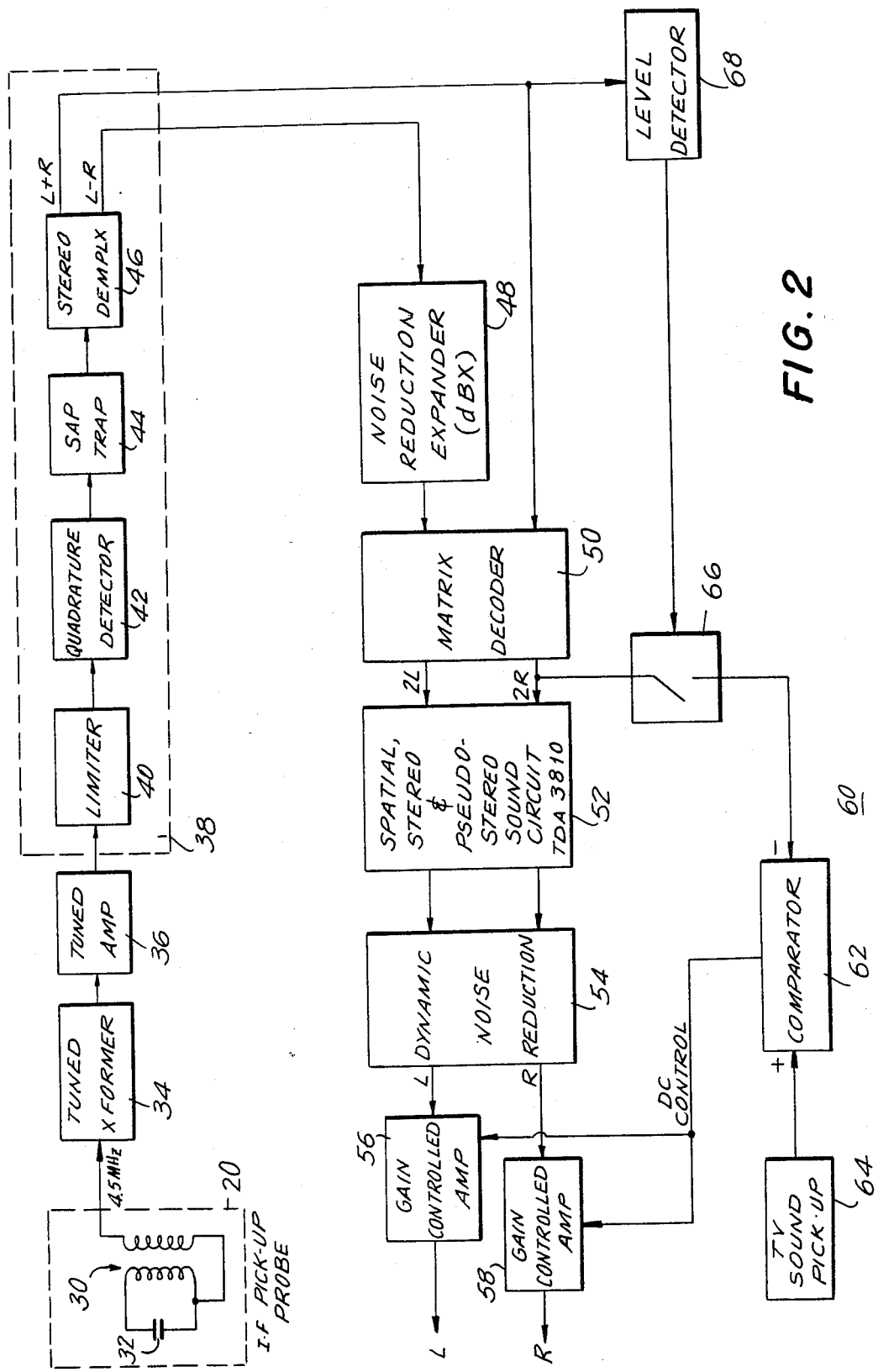
FIG. 2 is a block diagram of a preferred embodiment of this invention.

Referring now to the drawings, wherein like reference numerals are used throughout, and in particular to FIG. 1, a representation of the manner in which stereo adapter 10 of the present invention is used with a conventional television receiver 12 is depicted. The television receiver is assumed, for the purpose of the present description, to be of the type which does not include stereo detecting/decoding circuitry and, thus, is a television receiver with which the present invention finds ready application. It will, nevertheless, be appreciated that even if television receiver 12 includes a stereo detector/decoder, adapter 10 may be utilized therewith.

The illustrated television receiver includes a cabinet in which the usual circuitry, television picture tube, loudspeakers, manual selectors and manual controls are housed. As depicted, the manual selectors may comprise conventional channel selecting push-buttons; although the rotary turret-type channel selector may be provided. Television receiver 12 also includes a sound volume adjustment 14 which, as is conventional, is operated by the user to increase or decrease the volume of sound emanating from loudspeaker 16. It is expected that other controls, such as picture brightness, picture contrast and color controls, are included in television receiver 12. In addition, a headphone jack 18 may be provided in the cabinet, this headphone jack being conventional and connectable to a headphone plug to enable the user to listen to the audio portion of broadcasted television programs without disturbing others. If this headphone jack is provided, it is appreciated that sound volume adjustment 14 operates to adjust the sound level of the audio signals reproduced from the headphone jack.

Stereo adapter 10 includes, broadly, an IF probe 20 and a stereo detector/decoder 22, the latter operating in conjunction with the IF probe to produce left-channel (L) and right-channel (R) audio signals. Stereo detector/decoder 22 is coupled to a pair of loudspeakers 24 and 26 for reproducing left-channel and right-channel audible sounds. As an optional feature, a microphone 28 may be connected to stereo detector/decoder 22 for supplying thereto electrical signals representing the output sound level emanating from loudspeaker 16. As an alternative, microphone 28 may be replaced by a suitable plug that mates with headphone jack 18. The purpose of supplying stereo detector/decoder 22 with signals representing the output sound level of television receiver 12 will be discussed below.

In both conventional audio transmissions and stereo transmissions that accompany television broadcasting, the audio signals are modulated onto an audio carrier that is separate from the carrier onto which the video signals are modulated. As used herein, the expression "composite television signals" means both the video and audio signals which are transmitted by a television broadcaster for reception at various ones of television receivers. The frequency $f_s$ of the audio carrier is 4.5 MHz greater than the frequency $f_v$ of the video carrier. This frequency difference of 4.5 MHz remains substantially constant even though different carriers are used for different television channels. Some of these frequencies are as follows:

| Channel | $f_v$ MHz | $f_s$ MHz |
|---|---|---|
| 2 | 55.25 | 59.75 |
| 4 | 67.25 | 71.75 |
| 5 | 77.25 | 81.75 |
| 7 | 175.25 | 179.75 |
| 9 | 187.25 | 191.75 |
| 11 | 199.25 | 203.75 |
| 13 | 211.25 | 215.75 |

It is seen, therefore, that although the video and audio carriers $f_v$ and $f_s$ vary from one channel to the next, the audio carrier for each channel remains 4.5 MHz greater than the video carrier.

Television receiver 12 includes the usual IF section which, as is known, converts the different video carriers $f_v$ to a common video IF carrier whose frequency is 45.75 MHz, and converts the various audio carriers $f_s$ to a common audio IF carrier of frequency 41.25 MHz. Of course, the video IF carrier contains the various video components modulated thereon and the audio IF carrier contains the audio signals modulated thereon. Since the video and audio IF carriers remain separated by the aforementioned 4.5 MHz, simple filtering may be used to separate the video and audio information and to process and reproduce that information independently. As is also conventional, the IF section of television receiver 12 further converts the audio IF carrier to 4.5 MHz, and generates leakage audio IF signals. Such leakage, or spurious, IF audio signals are detected by IF probe 20 which, as will be described below, is tuned to the audio IF carrier frequency of 4.5 MHz. In the preferred embodiment, the IF probe is an inductive probe comprised of a tuned transformer. It is contemplated, however, that other devices may be used, such as a capacitive pick-up probe.

An advantageous feature of utilizing IF probe 20 is the omission of any physical or electrical connections between that probe and the internal circuitry of television receiver 12. The signal strength of the leakage, or spurious, IF audio signals normally generated by the IF section of the television receiver is sufficient to be detected and to induce within probe 20 the flow of IF audio signals. Probe 20 merely need be placed on, around or under the cabinet of television receiver 12. Preferably, the probe should be located proximate the physical position of the IF section of the television receiver. If accessible, therefore, probe 20 can be positioned within the cabinet at that location. Satisfactory results are obtained, nevertheless, by disposing probe 20 externally of the cabinet. As an example, the probe may comprise a suitable inductance pick-up, such as a cup core having a transformer wound thereon, the probe assembly being secured to a suction cup or other means by which the probe may be mounted or otherwise adhered to the cabinet of television receiver 12.

In operation, the IF audio signals induced in probe 20 are supplied to stereo detector/decoder 22 whereat the IF audio signal is demodulated, and the presence of a stereophonic component is detected and decoded into separate left-channel and right-channel signals which, for convenience, are identified hereinafter as the L and R signals. In the event that the transmitted audio signals which accompany the program to which television receiver 12 is tuned merely are monophonic signals and, thus, do not include a stereophonic component, stereo detector/decoder 22 may produce simulated left and right channel signals, such simulated signals being referred to hereinafter as L' and R' signals.

Thus, even if television receiver 12 is not equipped to detect and decode transmitted stereo audio signals, adapter 10 may be used therewith to recover such stereo signals. Adapter 10 provides the further advantage of producing simulated L' and R' signals even if the transmitted audio signals merely are monophonic signals.

Optionally connected microphone (headphone plug) 28 is used to control the output level of the L and R (or L' and R') signals produced by adapter 10. Typically, sound volume adjustment 14 of television receiver 12 is operated to increase or decrease the gain of the audio amplifier which drives loudspeaker 16. This gain adjustment usually is set manually and is not varied as a function of the magnitude of the demodulated audio signal. Since the user of television receiver 12 will be accustomed to adjusting the sound output level thereof by means of this sound volume adjustment, it is preferable that adapter 10 not be provided with its own independent volume adjustment. Rather, the audible volume emanating from loudspeakers 24 and 26 preferably should be established by the user's operation of sound volume adjustment 14. Microphone 28 operates to sense the output sound level generated by loudspeaker 16 and set the gain of the L and R (or L' and R') signals produced by stereo detector/decoder 22 as a function of that sensed output sound level. Hence, if the user has established a relatively low volume output level, the L and R signals are subjected to a relatively lower gain. Conversely, if the user has established a higher output volume, the L and R signals are subjected to a relatively higher gain. Microphone 28 may be disposed in a housing separate and apart from IF probe 20 or, alternatively, both devices may be provided in a common housing. As a further alternative, the output sound level to which television receiver 12 has been set by sound volume adjustment 14 may be sensed by connecting a plug to headphone jack 18, thus replacing microphone 28 with that plug.

Notwithstanding the optional use of a microphone, plug or other means to sense the output sound level of television receiver 12, adapter 10 may be provided with a manually adjustable sound level control, if desired.

Turning now to FIG. 2, there is illustrated a block diagram of a preferred embodiment of adapter 10. The adapter, as illustrated in greater detail herein, is comprised of IF probe 20, a stereo detector 38, a stereo decoder 50, noise reduction circuitry 48 and 54, and output terminals for supplying the decoded L and R signals to, for example, loudspeakers or other suitable transducers. IF probe 20 is comprised of a tuned transformer 30, the primary of which being connected to a capacitor 32 such that the LC resonant frequency is tuned to the audio IF frequency. A tuned transformer 34 is coupled to IF probe 20 and a tuned amplifier 36 is coupled to this tuned transformer. The combination of tuned transformers 30 and 34 and tuned amplifier 36 effectively eliminate extraneous signals from the IF audio signal.

Figure 6:
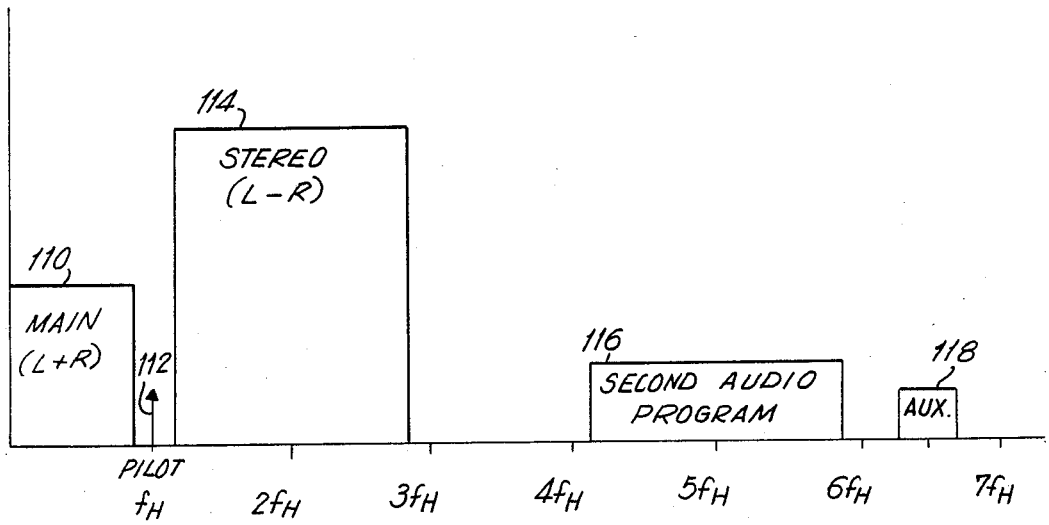
FIG. 6 is a graphical representation of the stereo spectrum for the audio portion that accompanies the television program.

Stereo detector 38 is adapted to detect the usual monophonic component and the stereophonic component, if the latter is transmitted from the IF audio signal. Using conventional notation, the monophonic component is identified as the (L+R) component and the stereophonic component is identified as the L−R) component. The monophonic and stereophonic components are frequency modulated onto the audio IF carrier and, in accordance with the Zenith system mentioned above, the IF audio carrier also is frequency modulated with a pilot signal of frequency $f_H$ (the horizontal synchronizing frequency), with a second audio program (modulated onto a subcarrier of frequency $5 f_H$) and with an auxiliary channel modulated onto a subcarrier of frequency $6.5 f_H$. The spectrum of the audio signals in the Zenith system is illustrated in FIG. 6. The purpose of stereo detector 38 is to separate the monophonic (L+R) and stereophonic (L−R) components while suppressing the second audio program and auxiliary channel from interfering with the separated monophonic and stereophonic components. As illustrated in FIG. 2, the stereo detector may be comprised of a limiter 40, a quadrature detector 42, a trap 44 and a stereo demultiplexer 46, all of these components being conventional and, thus, not being described in detail herein.

Limiter 40 is coupled to tuned amplifier 36 and is adapted to eliminate or at least minimize amplitude fluctuations in the frequency modulated audio IF signal.

The quadrature detector is coupled to limiter 40 and functions in a manner known to those of ordinary skill in the frequency modulator/demodulator art to recover the monophonic (L+R) and stereophonic (L−R) components from the frequency modulated IF audio signal. The quadrature detector includes means to recover the pilot signal and to utilize that pilot signal to detect the stereophonic component (L−R) which, as is conventional, is modulated onto a subcarrier of twice the pilot frequency, or $2 f_H$. Quadrature detector 42 also may include circuitry for recovering the second audio program and the auxiliary channel, each being modulated onto a separate subcarrier that is a multiple of the pilot frequency. However, such further detection or demodulation of the second audio program and auxiliary channel are not necessary for the successful operation of the adapter in accordance with the present invention.

The output of quadrature detector 42 is coupled through trap circuit 44 to stereo demultiplexer 46. The trap circuit may comprise, for example, a filter adapted to block higher frequency components, such as the second audio program and auxiliary channel which are modulated onto higher frequency subcarriers. Stereo demultiplexer 46 thus is supplied with the monophonic and stereophonic components and serves to separate and supply these components to separate outputs, as illustrated. Stereo demultiplexer 46 thus may comprise a frequency demultiplexer which discriminates between the relatively lower frequencies occupied by the monophonic component (L+R) and the relatively higher frequencies occupied by the stereophonic component (L−R) which, as mentioned above (and shown in FIG. 6), is modulated onto a subcarrier that is twice the pilot frequency. The monophonic component (L+R) is coupled to stereo decoder 50 and the stereophonic component (L−R), is demodulated from its subcarrier and then is supplied to decoder 50 via a noise reduction expander 48.

The individual components illustrated as comprising stereo detector 38 may be formed as, for example, an FM detector "chip" such as a Sanyo Model LA1235, coupled to a multiplex decoder "chip", such as Model LM1884 manufactured by National Semiconductor.

The adapter of the present invention is compatible with the Zenith system of stereophonic TV transmission, as mentioned above. Since the Zenith system employs noise reduction compression at the transmitter, the adapter of the present invention is provided with a compatible noise reduction expander 48. The noise reduction system utilized by the Zenith system has been developed by DBX Inc. of Waltham, Mass. Accordingly, noise reduction expander 48 comprises a dbx expander which is described in, for example, Audio Magazine, June 1984, pages 47-51. Expander 48 restores the stereophonic component (L−R) to its original form (i.e. prior to its being subjected to noise reduction compression), and the restored component is supplied to decoder 50.

Decoder 50 may comprise a conventional matrix decoder which, as is conventional, functions to sum the monophonic and stereophonic components and to subtract these components from each other. Decoder 50 thus produces respective channel-separated output signals identified in FIG. 2 as 2L and 2R. These decoded signals are supplied to a spatial/stereo/pseudo-stereo sound circuit 52.

Circuit 52 preferably is a Model TDA 3810 circuit manufactured by Signetics Corporation of Sunnyvale, Calif. Although not shown in FIG. 2, circuit 52 operates in response to the actuation of selector pushbuttons connected thereto. One of these pushbuttons is designated the "stereo synthesizer" selector which, when actuated, closes a switch to utilize one of the output signals produced by decoder 50, such as the left-channel output signal 2L, for the purpose of simulating the other channel signal (i.e. to simulate the right-channel signal). It is appreciated that, in the absence of the stereophonic component (L−R), as when a stereophonic transmission is not present, decoder 50 supplies at its outputs two substantially similar signals. Circuit 52 synthesizes left-channel and right-channel signals from one of those output signals. In the presence of the stereophonic component, the "stereo synthesizer" selector is disabled, and the output signals produced by decoder 50 merely are amplified by circuit 52. Another of the selector pushbuttons is designated the "expander" selector which, when actuated, closes another switch to increase the spatial separation effect of the left-channel and right-channel stereo signals. Further details of the construction and operation of circuit 52 are set out in literature published by Signetics Corporation in January 1984. Circuit 52 may be thought of as producing actual or simulated left-channel and right-channel output signals.

The respective output signals produced by circuit 52 are coupled to a conventional dynamic noise reduction circuit 54 which is adapted to provide, at its respective outputs, L and R signals. These outputs of noise reduction circuit 54 may be connected directly to output terminals or, as indicated in FIG. 2, may be connected to those output terminals by means of gain controlled amplifiers 56 and 58. It will be appreciated that, in accordance with the broader aspects of the present invention, such gain controlled amplifiers may be thought of as being optional.

Gain controlled amplifiers 56 and 58 are similar, and each preferably is comprised of a transconductance amplifier whose gain is set or adjusted by means of a DC gain controlled signal supplied thereto. The gain, or magnitude, of the L and R signals thus is adjusted or varied as a function of the DC gain control signal.

A gain control signal generator 60 is coupled to gain controlled amplifiers 56 and 58 to supply the aforementioned DC gain control signal thereto. Control signal generator 60 is comprised of a comparator 62 having one input connected to a sound pick-up 64 and another input connected to receive one of the left-channel and right-channel output signals produced by decoder 50. In the embodiment illustrated herein, the right-channel output signal 2R is supplied from decoder 50 to comparator 62. It will be appreciated, however, that the left-channel output signal 2L may be supplied to the comparator, if desired.

Sound pick-up 64 comprises microphone 28 (FIG. 1) or, alternatively, the plug which may be inserted into headphone jack 18 of television receiver 12. It is appreciated, therefore, that sound pick-up 64 supplies to comparator 62 a signal representing the output sound level of the television receiver. This signal varies not only as a function of the amplitude of the audio signal that is received by television receiver 12 but also as a function of the setting of sound volume adjustment 14.

Comparator 62 functions to compare the level of the signal representing the output sound level of the television receiver to the signal level of the decoded right- (or left) channel signal produced by decoder 50. The difference between these compared signals controls the gain of gain controlled amplifiers 56 and 58. For the purpose of the present description, it is assumed that comparator 62 includes inverting and non-inverting inputs so as to produce a DC gain control signal that is a function of the difference between the signals supplied thereto. Sound pick-up 64 is illustrated as being coupled to the non-inverting input of comparator 62 and the right-channel output signal produced by decoder 50 is illustrated as being coupled to the inverting input of the comparator. As the difference between the signal representing the output sound level of the television receiver and the decoded right-channel signal increases, the gain of the gain controlled amplifiers likewise increases. Conversely, as this difference decreases, the gain of amplifiers 56 and 58 is reduced. Comparator 60 preferably comprises a differential integrator, described in greater detail below.

To prevent comparator 62 from inadvertently changing the DC gain control signal produced thereby during pauses or periods of silence in the audio signal transmitted to the television receiver, it is preferred that the right-channel output signal produced by decoder 50 be uncoupled from the comparator during such pauses or periods of silence. To this effect, a switch 66 couples the right-channel output signal from decoder 50 to comparator 62, this switch being "opened" and "closed" as a function of the signal level of the monophonic component (L+R). As illustrated, the monophonic component produced by stereo demultiplexer 46 is coupled to a level detector 68 which senses when this monophonic component is above or below a predetermined threshold. When the monophonic component (L+R) is below that threshold, level detector 68 supplies a signal to switch 66 to effect the "opening" of that switch, thereby decoupling the right-channel output signal from comparator 62. Conversely, when the monophonic component (L+R) exceeds the aforementioned threshold level, switch 66 is "closed" to couple the right-channel output signal to the comparator.

The manner in which the adapter illustrated in FIG. 2 operates now will be briefly described. IF probe 20 picks up the audio IF signal that is produced as a leakage signal by the usual IF section included in television receiver 12. By reason of tuned transformer 30, tuned transformer 34 and tuned amplifier 36, the picked up IF signal is suitably amplified and also is isolated from most electrical noise. The IF audio signal supplied to stereo detector 38 is comprised of a 4.5 MHz carrier that is frequency modulated with the monophonic component (L+R), the stereophonic component (L−R) which, in turn, is modulated onto a subcarrier whose frequency is twice the frequency of the pilot signal, the pilot signal itself, a second audio program which is modulated onto a subcarrier whose frequency is five times the frequency of the pilot signal, and an auxiliary channel that is modulated onto yet another subcarrier whose frequency is 6.5 times the frequency of the pilot signal. Stereo detector 38 functions to "trap" or block the second audio program and the auxiliary channel, and to demodulate and demultiplex the monophonic and stereophonic components which are produced at the respective outputs of the detector.

The detected stereophonic component (L−R) is subjected to noise reduction expansion compatible with the noise reduction compression to which it had been subjected at the transmitter. Thus returned to its original form, the stereophonic component (L−R) is supplied to decoder 50 along with the detected monophonic component (L+R). As is conventional, decoder 50 decodes the left-channel and right-channel signals from the monophonic and stereophonic components supplied thereto, and these decoded signals are supplied to spatial/stereo/pseudo-stereo circuit 52. Circuit 52 may be omitted, if desired. In the event that a stereophonic transmission has been received, actual L and R output signals are provided at the outputs of circuit 52. However, if a stereophonic transmission is not present, circuit 52 produces simulated L' and R' output signals.

The output signals, either L and R or L' and R' signals, provided by circuit 52 are subjected to dynamic noise reduction and then the gains of the L and R (or L' and R') signals are adjusted accordingly by gain controlled amplifiers 56 and 58.

Gain controlled amplifiers 56 and 58 respond to the DC gain control signals supplied thereto by gain control signal generator 60 so as to amplify the L and R audio signals as a function, at least in part, of the setting of sound volume adjustment 14 of the television receiver. During a pause or period of silence, the level of the demultiplexed monophonic component (L+R) falls below the threshold level established by (or supplied to) level detector 68, thereby "opening" switch 66. This uncouples the right-channel signal produced by decoder 50 from being supplied to comparator 62. At the same time, it is expected that the output sound level of the television receiver is very low, and a correspondingly small (or zero) level signal is supplied to the non-inverting input of the comparator from sound pick-up 64. As a result, during such pauses or periods of silence, no change is imparted to the DC gain control signal supplied to the gain controlled amplifiers. Upon the next occurrence of an audio signal, the previously established gain of these amplifiers results in amplification of the L and R signals corresponding to the setting of sound volume adjustment 14. Hence, there are no sudden increases in the L and R signal levels which would otherwise result in sudden loud sounds emanating from loudspeakers 24 and 26. Likewise, there is no undesired negative change in the DC gain control signal during such pauses or periods of silence which otherwise would result in very low level sounds emanating from loudspeakers 24 and 26 upon the succeeding presence of a transmitted audio signal.

It is appreciated that, if desired, television receiver 12 may be used with a so-called remote control device by which the user may adjust the sound level (among other parameters) from a remote location. Gain controlled amplifiers 56 and 58 together with gain control signal generator 60 are adapted to function in the manner described above to amplify the L and R audio signals as a function, at least in part, of the setting of such a remote sound adjustment control device for that television receiver.

Turning now to FIG. 3, there is illustrated a schematic diagram of IF probe 20, tuned transformer 34 and tuned amplifier 36. IF probe 20 has been described above with respect to FIG. 2, and is illustrated once again as being comprised of a transformer 30 whose primary winding is coupled to a capacitor 32, the values of the capacitance of capacitor 32 and the inductance of the transformer being such that the resonant frequency thereof is equal to 4.5 MHz, the audio IF frequency. The secondary winding of transformer 30 is coupled to the primary winding of tuned transformer 34; and the secondary winding of this latter transformer is coupled to the input (or gate) electrode of an FET 70. It is seen that the secondary winding of transformer 34 also is connected in parallel with an RC circuit whose values are selected, in combination with the inductance of transformer 34 to provide a resonant frequency equal to 4.5 MHz.

Tuned amplifier 36 is comprised of FET 70, a tuned transformer 72, another FET 74 and another tuned transformer 76. Although FET's are illustrated as being the amplifying transistors, it is appreciated that other equivalent amplifying transistors may be used, if desired.

The input, or gate, electrode of FET 70 is coupled to tuned transformer 34, as mentioned above, and a bias voltage is generated at the source electrode by means of the illustrated RC circuit connected thereto. Tuned transformer 72 is connected in the drain circuit of FET 70, and the primary of this transformer is connected to another RC circuit, resulting in a resonant frequency equal to 4.5 MHz. The secondary winding of tuned transformer 72 is connected to the gate electrode of FET 74 whose source electrode is supplied with a bias voltage by reason of the illustrated RC circuit connected thereto.

Finally, the drain electrode of FET 74 is connected to tuned transformer 76 whose primary winding is connected in parallel with the illustrated RC circuit to resonate at 4.5 MHz. The secondary winding of transformer 76 supplies an amplified IF audio signal to limiter 40 of stereo detector 38.

Thus, it is seen that the multiple stages of amplification provide adequate gain, or boosting, to the IF audio signals which are picked up by IF probe 20. Furthermore, the use of successive stages of tuned transformers substantially eliminates extraneous noise and interference from the picked up IF audio signals.

A preferred embodiment of gain control signal generator 60 now will be described in conjunction with the partial block, partial schematic diagram of FIG. 4. Comparator 62 is comprised of a differential integrator 84 having a non-inverting input coupled to sound pick-up 64 by means of a rectifying circuit formed of amplifier 78, low pass filter 80 and rectifier 82. The differential integrator also includes an inverting input coupled to a rectifying circuit comprised of low pass filter 90 and rectifier 92, the output of this rectifying circuit being connected through an FET switch 94 which, as is appreciated, is a preferred embodiment of aforementioned switch 66 (FIG. 2). The output of differential integrator 84 is coupled to a capacitor 86 which is connected in the resistive feedback circuit thereof, and the output of the differential integrator also is connected, by means of a resistor, to a storage capacitor 88.

Figure 4:
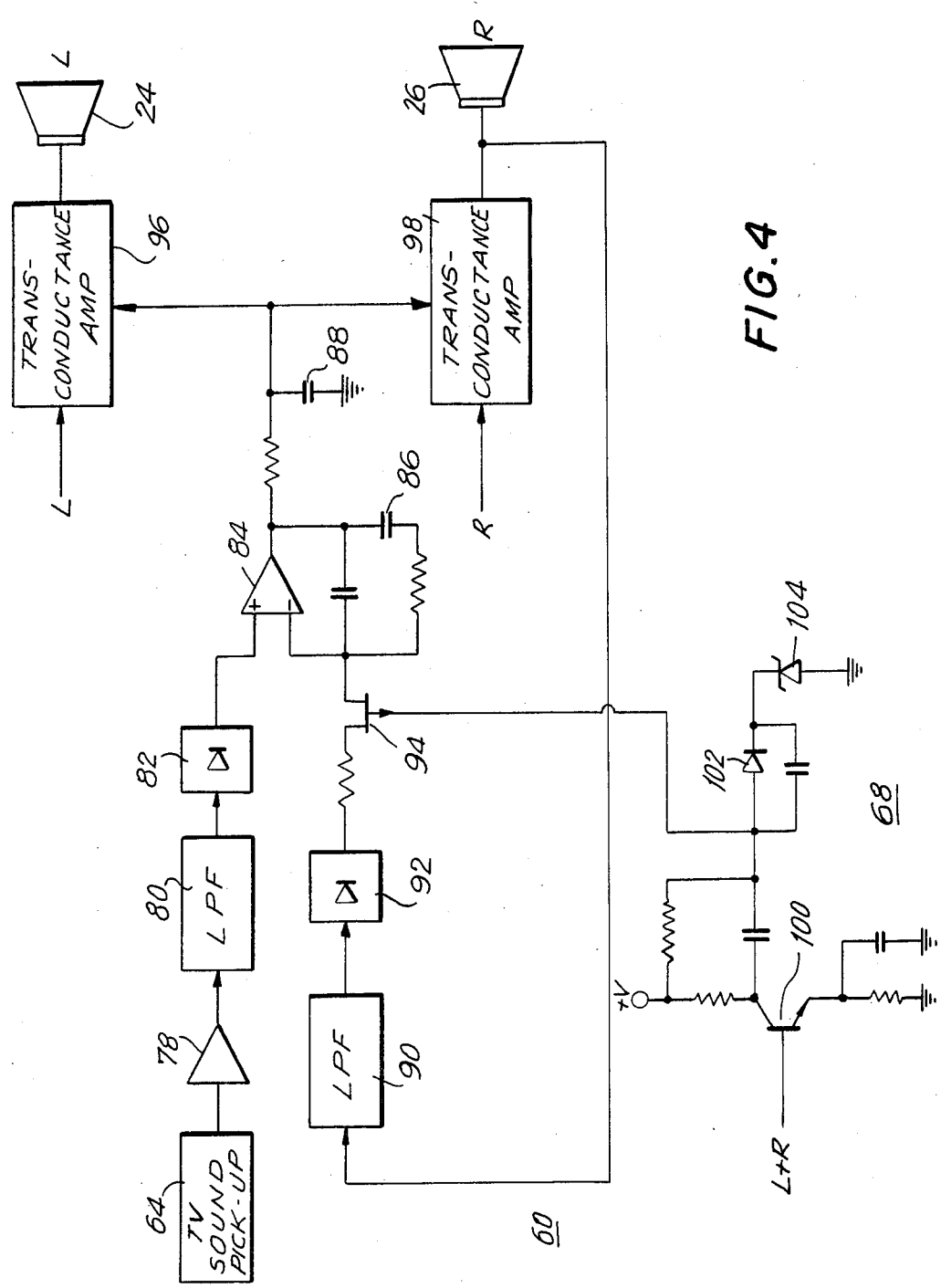
FIG. 4 is a partial block, partial schematic diagram of the gain control circuit that may be used with this invention.

FET switch 94 has its gate electrode connected to monophonic level detector 68, which, as illustrated in FIG. 4, is comprised of an amplifying transistor 100 whose base electrode is supplied with the monophonic component (L+R) from stereo detector 38 (FIG. 2) and whose collector electrode is connected to a threshold comparator comprised of a rectifying diode 102 and a zener diode 104. The emitter electrode of transistor 100 is supplied with a bias voltage by means of the illustrated RC circuit connected thereto.

The cathode of diode 102 included in the threshold comparator is connected to the zener diode, thus limiting the maximum voltage level that may be present at the anode of diode 102. As illustrated, this anode is connected to the gate electrode of FET switch 94 which, preferably, comprises a p-type FET.

The DC voltage produced across capacitor 88 at the output of differential integrator 84 is supplied in common to the aforementioned gain controlled amplifiers which, as described above and as illustrated herein, preferably comprise conventional transconductance amplifiers 96 and 98, the gains of these amplifiers being controlled as a function of the DC voltage applied thereto. The outputs of transconductance amplifiers 96 and 98 are connected to loudspeakers 24 and 26 to drive these loudspeakers to reproduce the left-channel and right-channel audible sounds.

In operation, sound pick-up 64 produces a signal representing the sound level of television receiver 12, as described above. This signal is amplified and rectified to supply a corresponding DC signal to the non-inverting input of differential integrator 84. It is appreciated that the level of this DC signal varies as a function of the output sound level of the television receiver.

The amplified R signal produced by transconductance amplifier 98 is fed back and rectified to a DC signal, this DC signal being supplied via FET switch 94 to the inverting input of the differential integrator. Although the R signal is seen to be fed back to the differential integrator, it is readily appreciated that, if desired, the L signal may be fed back thereto. The DC signal thus derived from the fed back R (or L) signal represents the magnitude of the audio signal picked up by IF probe 20, detected by stereo detector 38 and decoded by stereo decoder 50. Although not shown in FIG. 4, it is appreciated that the L and R signals supplied to transconductance amplifiers 96 and 98 are the same L and R signals that are produced by dynamic noise reduction circuit 54 (FIG. 2). Thus, it will be seen that the level of the DC signal supplied to the non-inverting input of differential integrator 84 is a function, at least in part, of the setting of sound volume adjustment 14; and the level of the DC signal supplied to the inverting input of the differential integrator is a function of the volume of the sound produced by loudspeakers 24 and 26. As the sound volume adjustment level increases, that is, as the DC signal supplied to the non-inverting input of differential integrator 84 increases, the gain of transconductance amplifiers 96 and 98 increases to increase the volume of the sound produced by loudspeakers 24 and 26. Conversely, as the level of the signal produced by sound pick-up 64 decreases, the transconductance amplifier gains likewise decrease. Hence, loud output sounds will not be produced in the event that a low level has been set by sound volume adjustment 14. In this manner, the level of the output sounds is controlled by the sound volume adjustment of the television receiver.

During pauses or periods of silence, the monophonic component (L+R) is at a relatively low level, as is appreciated from the foregoing discussion of the adapter shown in FIG. 2. Accordingly, the (L+R) signal supplied to transistor 100 from stereo detector 38 renders the transistor non-conductive. As a result, the voltage level at the collector electrode of this transistor increases to the operating potential level (+V), thereby forward biasing rectifying diode 102. However, the maximum voltage that may be present at the anode of diode 102 is limited by the zener breakdown voltage of zener diode 104. This reference voltage, which in the described example is a positive voltage, is supplied from the anode of diode 102 to the gate electrode of FET switch 94 to render that switch non-conductive. Consequently, the DC signal derived from transconductance amplifier 98 is inhibited from being supplied to the inverting input of differential integrator 84. At this time, therefore, the differential integrator does not vary the voltage across capacitor 88, thus maintaining the same gain at the transconductance amplifiers during such pauses or periods of silence.

When sound is present, the monophonic component (L+R) increases in magnitude, thereby rendering transistor 100 conductive. The voltage at the anode of diode 102 thus falls below the reference voltage level supplied by zener diode 104 to turn on FET switch 94. Consequently, the DC voltage derived from the R output of transconductance amplifier 98 is supplied by the FET switch to the inverting input of differential integrator 84. The difference between this DC level and the DC level derived from sound pick-up 64 is integrated and varies the voltage across capacitor 88. Accordingly, the gain of transconductance amplifiers 96 and 98 is adjusted accordingly.

Thus, it is seen that the volume of the sound produced by loudspeakers 24 and 26 is controlled, at least in part, as a function of the output sound level of the television receiver and as a function of the magnitude of the audio signal which is received at that television receiver.

Figure 5:
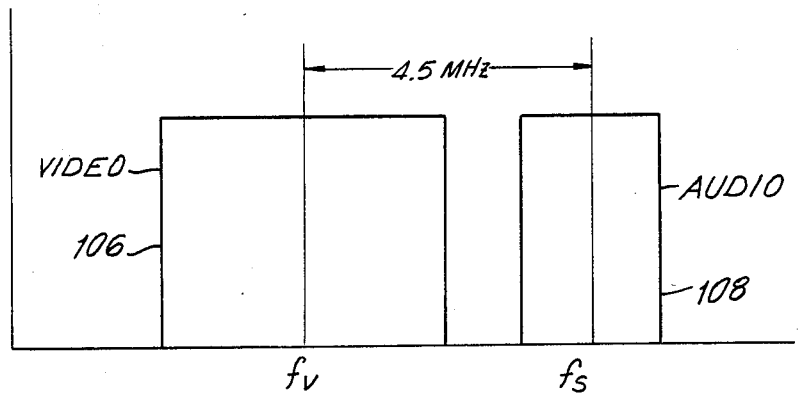
FIG. 5 is a graphical representation of the video and audio transmission spectra.

FIG. 5 is a graphical representation of the video and audio spectra transmitted to the television receiver. The video bandwidth 106 is centered on the video carrier frequency $f_v$, and the video bandwidth contains the usual video signals, including the horizontal synchronizing signal, the video information signal, the chrominance information signal, and the like. The audio bandwidth 108 is seen to be centered on the audio carrier frequency $f_s$ which, in accordance with the convention adopted in the United States, is separated from the video frequency carrier by 4.5 MHz. The audio bandwidth 108 contains the audio signals that are transmitted from the broadcasting source, including the usual monophonic component and, if stereophonic audio transmissions are effected, the stereophonic component, as well as the second audio program and the auxiliary channel.

FIG. 6 is a graphical representation of the spectrum of those audio signals, prior to frequency modulation onto the audio carrier, normally transmitted in accordance with the Zenith system of stereo TV broadcasting. Thus, the graphical representation of the spectrum shown in FIG. 6 is the base band spectrum containing the monophonic component (L+R) 110, the pilot signal 112 (of frequency $f_H$), the stereophonic component (L−R) 114 which is modulated onto a subcarrier whose frequency is 2 $f_H$, the second audio program 116 which is modulated onto another subcarrier of frequency 5 $f_H$ and the auxiliary information spectrum 118 which is modulated onto yet another subcarrier of frequency 6.5 $f_H$. It will be appreciated that the spectrum illustrated in FIG. 6 is provided at the output of quadrature detector 42 of stereo detector 38 (FIG. 2). It will be recognized that the spectrum illustrated in FIG. 6 is the typical frequency spectrum of the Zenith system.

While the present invention has been particularly shown and described with reference to a preferred embodiment, it will be readily apparent to those of ordinary skill in the art that various changes and modifications may be made without departing from the spirit and scope of the invention. For example, the use of gain controlled amplifiers 56 and 58, together with the gain control signal generator therefor shown at FIG. 4, may be omitted, if desired. Likewise, spatial/stereo/pseudo-stereo circuit 52 may be replaced by conventional amplifiers which merely amplify the left-channel and right-channel output signals provided by decoder 50. Other changes and optional omissions or substitutions are contemplated.

It is intended that the appended claims be interpreted as including the foregoing as well as other changes and modifications.

What is claimed is:

1. A TV stereo adapter for use with a television receiver to detect and decode stereophonic audio signals that are transmitted with composite television signals, said adapter comprising:

IF pick-up means physically separate from said television receiver for picking up spurious IF audio signals normally generated by said television receiver;

stereo detecting means for detecting from said IF audio signals monophonic and stereophonic components that are transmitted with said composite television signals;

coupling means tuned to the IF carrier frequency of the picked up IF audio signals and connected between said IF pick-up means and said stereo detecting means for supplying said picked up IF audio signals at said IF carrier frequency to said stereo detecting means;

stereo decoding means responsive to the detected components for decoding left-channel and right-channel audio signals therefrom; and output means for providing left-channel and right-channel signals adapted to drive sound transducing means.

2. The adapter of claim 1 wherein said IF pick-up means comprises a pick-up probe positionable proximate the IF stage normally provided in said television receiver.

3. The adapter of claim 2 wherein said pick-up probe comprises an inductive probe tuned to said audio IF frequency for inducing the flow therein of IF audio signals.

4. The adapter of claim 1 wherein the transmitted stereophonic audio signals include a monophonic component (L+R) and a stereophonic component (L−R), with said stereophonic component (L−R) being subjected to noise reduction compression prior to transmission, and wherein said stereo decoding means includes noise reduction expansion means for subjecting said stereophonic component (L−R) to noise reduction expansion that is compatible with said noise reduction compression.

5. The adapter of claim 4 wherein said stereo decoding means includes a decoder coupled to said noise reduction expansion means to receive the noise reduced expanded stereophonic component (L−R), and means for supplying the detected monophonic component (L+R) to said decoder, said decoder being operative to produce left-channel (L) and right-channel (R) signals from the components supplied thereto.

6. The adapter of claim 5 wherein said decoder comprises a matrix decoder for summing the components supplied thereto ((L+R)+(L−R)) and for subtracting the components supplied thereto ((L+R)−(L−R)).

7. The adapter of claim 5 wherein said stereo decoding means further includes stereo/pseudo-stereo change-over means coupled to said decoder and operable when a stereophonic component (L−R) is detected to supply the left-channel (L) and right-channel (R) signals produced by said decoder to said output means, said change-over means being operable when a stereophonic component (L−R) is not detected to simulate from one of the channel signals (L or R) produced by said decoder the other channel signal (R or L) and to supply to said output means said one channel signal and the simulated channel signal.

8. The adapter of claim 1 wherein said output means includes automatic gain control means for controlling the gain of said left-channel and right-channel signals in response to a gain controlling signal applied thereto; and generating means responsive, at least in part, to the output sound level of said television receiver to generate said gain controlling signal.

9. The adapter of claim 8 wherein said generating means comprises a sound signal source for providing a signal representing said output sound level of said television receiver; and comparator means for comparing the sound-representing signal provided by said sound signal source to at least one of said left-channel and right-channel signals for generating a gain controlling signal whose magnitude varies with the difference between the signals compared by said comparator means.

10. The adapter of claim 9 further comprising switch means for coupling said at least one of said left-channel and right-channel signals to said comparator means; and switch control means for opening said switch means to inhibit said at least one of said left-channel and right-channel signals from being coupled to said comparator means when the magnitude of the detected monophonic component is below a predetermined threshold.

11. The adapter of claim 10 wherein said switch control means comprises level detecting means, and means for supplying said detected monophonic component to said level detecting means.

12. The adapter of claim 10 wherein said comparator means comprises differential integrating means having a first input connected to receive said sound-representing signal, a second input connected to receive said at least one of said left-channel and right-channel signals coupled by said switch means, and an output for providing a signal representing the integral of the difference between the signals applied to said first and second inputs.

13. The adapter of claim 9 wherein said television receiver is provided with at least one loudspeaker; and said sound signal source comprises a microphone for picking up sounds produced by the loudspeaker of said television receiver to provide said sound-representing signal.

14. A TV stereo adapter for use with a television receiver to detect and decode stereophonic audio signals that are transmitted with composite television signals, said adapter comprising:

IF pick-up means physically separate from said television receiver for picking up spurious IF audio signals normally generated by said television receiver;

stereo detecting means coupled to said IF pick-up means for detecting from said IF audio signals monophonic and stereophonic components that are transmitted with said composite television signals;

stereo decoding means responsive to the detected components for decoding left-channel and right-channel audio signals therefrom;

output means for providing left-channel and right-channel signals adapted to drive sound transducing means and including automatic gain control means for controlling the gain of said left-channel and right-channel signals in response to a gain controlling signal applied thereto;

a sound signal source for providing a signal representing the output sound level of said television receiver;

comparator means for comparing the sound-representing signal provided by said sound signal source to at least one of said left-channel and right-channel signals for generating a gain controlling signal whose magnitude varies with the difference between the signals compared by said comparator means;

said television receiver being provided with a headphone jack, and said sound signal source comprising a plug for connection with said headphone jack for coupling sound-representing signals normally provided at said headphone jack.

15. A TV stereo adapter for detecting and decoding stereophonic audio signals that are received by a television receiver and comprising:

IF pick-up means positionable proximate the usual IF converter section normally provided in said television receiver for picking up leakage audio IF signals at an IF carrier frequency as produced by said IF converter section;

stereo detecting means for detecting monophonic (L+R) and stereophonic (L−R) components that may be included in said picked up audio IF signals;

means coupled to said IF pick-up means for supplying said picked up audio IF signals at the produced IF carrier frequency to said stereo detecting means;

noise reduction means coupled to said stereo detecting means for subjecting said stereophonic (L−R) component to a noise reducing operation; and stereo decoding means responsive to the monophonic (L+R) component from said stereo detecting means and to the stereophonic (L−R) component from said noise reduction means to produce left-channel (L) and right-channel (R) audio signals for driving sound transducing means.

16. The adapter of claim 15 wherein said stereophonic (L−R) component is subjected to noise reduction compression prior to being received by said television receiver, and said noise reduction means includes expansion means compatible with said noise reduction compression.

17. The adapter of claim 15 further comprising gain controlled amplifying means for amplifying said left-channel (L) and right-channel (R) audio signals as a function, at least in part, of the setting of sound adjustment means normally included in said television receiver.

* * * * *